United States Patent [19]

Yamanaka et al.

[11] Patent Number: 4,784,984

[45] Date of Patent: Nov. 15, 1988

[54] STAINLESS STEEL RIBBON FOR USE AS A CATALYST CARRIER FOR AUTOMOBILE EXHAUST GAS AND CATALYST CARRIER CONTAINING THE RIBBON COILED INTO A HONEYCOMB

[75] Inventors: Mikio Yamanaka; Keiichi Omura; Masayuki Tendo, all of Sagamihara; Susumu Takemura, Tokyo; Takashi Sato; Tsutomu Ozawa, both of Kawasaki, all of Japan

[73] Assignee: Nippon Steel Corporation, Tokyo, Japan

[21] Appl. No.: 8,954

[22] Filed: Jan. 30, 1987

[30] Foreign Application Priority Data

Jan. 30, 1986 [JP] Japan .............................. 61-016915
Mar. 17, 1986 [JP] Japan .............................. 61-056896

[51] Int. Cl.$^4$ ..................... B01J 32/00; B01J 35/04
[52] U.S. Cl. .................................. 502/439; 502/527; 428/607; 428/610; 428/653; 428/941
[58] Field of Search ................. 502/334, 439, 527; 428/607, 610, 653, 941

[56] References Cited

U.S. PATENT DOCUMENTS

| 4,300,956 | 11/1981 | Rosenberger et al. | 148/6.3 |
| 4,318,828 | 3/1982 | Chapman | 502/527 X |
| 4,331,631 | 5/1982 | Chapman et al. | 502/439 X |

FOREIGN PATENT DOCUMENTS

| 0091526 | 10/1983 | European Pat. Off. | |
| 2856795A | 10/1979 | Fed. Rep. of Germany | |
| 50-66492 | 6/1975 | Japan | 502/527 |
| 1452982 | 10/1976 | United Kingdom | |

Primary Examiner—W. J. Shine
Attorney, Agent, or Firm—Wenderoth, Lind & Ponack

[57] ABSTRACT

An Al-containing stainless steel is rapidly solidified from a molten state to produce a ribbon. In catalyst carrier for the exhaust gas of automobile, the Al is utilized for the formation of $\alpha\text{-Al}_2\text{O}_3$ whiskers, which carry and rigidly bond the $\gamma\text{-Al}_2\text{O}_3$ powder to the ribbon, as the direct carriers of noble metals.

10 Claims, 3 Drawing Sheets

STAINLESS STEEL RIBBON FOR USE AS A CATALYST CARRIER FOR AUTOMOBILE EXHAUST GAS AND CATALYST CARRIER CONTAINING THE RIBBON COILED INTO A HONEYCOMB

BACKGROUND OF THE INVENTION

1. Field of the Invention

The present invention relates to a catalyst carrier made of a stainless steel ribbon, used for the exhaust-gas purification device of an automobile, and a method for producing the same.

2. Description of the Related Arts

Recently, particularly from about 1970, control of the exhaust gas of automobiles has been seriously considered. Accordingly, a law concerning the control of the automobile exhaust gas emissions was promulgated to the effect that the passenger automobiles must be equipped with a device for purifying the exhaust gas. Several systems were proposed for devices for purifying the exhaust gas, but the most widely used at present is a catalyst converter system, according to which HC and CO are oxidized and, simultaneously, NOx is reduced. The structure of these catalyst converters is such that a carrier, which is a honeycomb sintered body of ceramic mainly composed of corderite, is mounted in a metallic cylinder, as a fundamental body, and porous $\gamma$-$Al_2O_3$ powder, which is impregnated with a noble metal (Pt~Pd) catalyst, is disposited on the carrier. The honeycomb ceramic has, however, disadvantages in that it is not resistant to mechanical impact, a part of the exhaust gas is able to bypass the conversion by escaping through the clearance between the honeycomb and the outer cylinder, and in addition, the exhaust resistance is rather high. To cope with these disadvantages, Japanese Unexamined Patent Publication No. 57-71898 disclosed a several tens of microns thick ribbon rolled from high Al ferritic stainless steel laminated with a corrugated sheet which is produced by forming the ribbon, or coiled in the form of a roll, thereby enabling it to be used as the carrier instead of the ceramic honeycomb mentioned above. Japanese Unexamined Patent Publication No. 56-96726 also disclosed a round bar of high Al ferritic stainless steel which is subjected to peeling to obtain cutting chips for producing a ribbon used for the metal honeycomb. Since a high degree of working strain during the peeling is introduced into the stainless steel ribbon produced by this method, when the ribbon is treated in a high temperature, oxidizing atmosphere, the diffusion of Al from the interior to the surface of the ribbon is promoted, which results in the formation of $Al_2O_3$ in the form of whiskers, which enhances a rigid bonding of $\gamma$-$Al_2O_3$ powder, i.e., the direct carrier of noble metal-catalyst, on the honeycomb. Nevertheless, these techniques have several disadvantages, in that, in the technique for producing a ribbon for the carrier by a rolling method, since a high Al stainless steel, whose workability is inherently not excellent, is cold-rolled to obtain an approximately 40~50 $\mu$m thick ribbon, the annealing and pickling steps must be repeated several times during the course of the rolling, which leads to an increase of costs. In addition, several limitations must be interposed on the alloying components from the viewpoint of rollability, with result that a satisfactory oxidation resistance property is obtained only with difficulty. That is, since Al in the ribbon is consumed, while forming a selective oxidation film made of $Al_2O_3$ during service at a high temperature and a thickness of a ribbon used for the catalyst carrier of only tens of microns, the Al concentration of a ribbon decreases during service. Accordingly, Al in the ribbon may be consumed prior to the formation of a satisfactorily thick and protective $Al_2O_3$ film at a service temperature. In this case, Cr and Fe are then oxidized with an increased speed, and finally, the entire ribbon is oxidized. Accordingly, to enhance the durable service temperature, the Al content in a ribbon must be as high as possible. On the other hand, since Al in a high concentration degrades the rollability, the Al content is limited to approximately 5% at maximum as long as the ribbon is produced by the rolling method. This Al content limits the durable service temperature in exhaust gas to 950° C. at the highest, when the thickness of a ribbon is 40 $\mu$m. It seems obvious that this durable limit is not satisfactory for the various conditions anticipated.

Also for the peeling technique, it is difficult to stably obtain a ribbon having a uniform thickness and width. Investigation, therefore had been made into the development of a catalyst carrier for an exhaust gas of an automobile, consisting of a stainless steel ribbon with a higher Al content, and thus an improved oxidation-resistance, and having an improved adhesion of $\gamma$-$Al_2O_3$ powder, i.e., the direct carrier of the catalyst, and a method for producing such a catalyst carrier.

SUMMARY OF THE INVENTION

The present invention was completed as a result of investigations into answers to the needs described above.

It is an object of the present invention to provide a ribbon for use in the catalyst carrier of the exhaust gas purification device of automobiles, provided with all of the properties described above.

It is another object of the present invention to provide a catalyst carrier of the exhaust gas purification device of automobiles, provided with all of the properties described above.

It is a further object of the present invention to provide a method for producing a ribbon for use in the catalyst carrier of the exhaust gas purification device of automobiles, provided with all of the properties described above.

It is also an object of the present invention to provide a method for producing a catalyst carrier of the exhaust gas purification device of automobiles, provided with all of the properties described above.

In accordance with the first mentioned object, there is provided a ribbon for use as a catalyst carrier of an exhaust gas purification device of an automobile consisting of an Al-containing, rapidly solidified stainless steel.

Preferably, the ribbon has an Al-concentrated layer on a surface thereof. There is also provided an Al-containing, rapidly solidified stainless steel ribbon for use as a catalyst carrier of an exhaust gas purification device, characterized in that the ribbon has an Al-concentrated layer on a surface thereof, and has a thickness of from 30 to 70 $\mu$m, and a structure thereof is a columnar structure with grain boundaries principally oriented in a direction along the thickness of the ribbon, and a grain diameter measured in a longitudinal direction of the ribbon being 30 $\mu$m at the greatest.

In accordance with the second mentioned object, there is provided a catalyst carrier for an exhaust gas purification device of an automobile, consisting of Al-containing, rapidly solidified stainless steel ribbon which contains such a high content of Al as making the stainless steel nonrollable by cold-rolling but promoting diffusion of the Al in the interior to the surface of ribbon to form, on the ribbon, an $\alpha$-$Al_2O_3$ layer having a thickness sufficient for carrying $\gamma$-$Al_2O_3$ with noble metal impregnated. Preferably, the ribbon has an Al-concentrated layer on a surface thereof. There is also provided a catalyst carrier for the exhaust gas purification device of an automobile, consisting of an Al-containing, rapidly solidified stainless steel ribbon in the form of a honeycomb, characterized in that it has an Al-concentrated layer on a surface thereof, and a $\gamma$-$Al_2O_3$ layer on the Al-concentrated layer, for carrying a noble metal catalyst, a thickness of from 30 to 70 $\mu$m, and a metallurgical structure thereof is a columnar structure with grain boundaries principally oriented in a direction along the thickness of the ribbon, and a grain diameter measured in a longitudinal direction of the ribbon being 30 $\mu$m at the greatest.

In accordance with the third mentioned object, there is provided a method for producing a ribbon, characterized by solidifying an Al-containing stainless steel from a molten state thereof directly into a form of a ribbon at a cooling speed of at least $10^3$ °C./sec. The rapid solidification in air is carried out to produce an Al-containing stainless steel ribbon having an Al-concentrated layer on its surface.

In accordance with the fourth mentioned object, there is provided a method for producing a catalyst carrier for an exhaust gas purification device of an automobile, characterized by solidifying an Al-containing stainless steel from a molten state directly into a form of a ribbon at a cooling speed of at least $10^3$ °C./sec, coiling the ribbon at a temperature of at least 500° C., preferably at least 600° C., and subsequently forming the ribbon into a form of honeycomb.

The Al-containing stainless steel described herein designates such a steel containing at least 1% by weight (all percentages hereinafter based on weight) of Al, to cause a selective oxidation of Al on the surface of the ribbon. As described hereinabove, to enhance the oxidation resistance of a ribbon for use as a carrier, the Al content is desirably as high as possible, provided that it is not in a range wherein the melting point of a ribbon becomes too low. According to the present invention, it is possible to obtain a ribbon containing more than 5% of Al, which cannot be cold rolled and, therefore, a ribbon for use as a catalyst carrier obtained in accordance with the present invention exhibits an extremely improved oxidation resistance and a high heat resistance limit. For example, for a 40 $\mu$m thick ribbon containing 5% of Al, the Al in the ribbon is consumed, when an $\alpha$-$Al_2O_3$ film grows to a thickness of approximately 5 $\mu$m at one side. This thickness is, however, sufficient to prevent the ribbon from oxidation in an exhaust gas at 1000° C. over a long period of time. On the other hand, for a 40 $\mu$m thick ribbon containing 10% of Al, the Al contained therein is sufficient for forming an approximately 10 $\mu$m thick $\alpha$-$Al_2O_3$ film. However, actually, the growth of an $\alpha$-$Al_2O_3$ film advances in the exhaust gas at a temperature of 1000° C. to an extent such that the thickness thereof becomes approximately 7 $\mu$m or more, and subsequently, oxidation virtually does not advance. Accordingly, a 40 $\mu$m thick ribbon containing 10% of Al can maintain oxidation resistance in the exhaust gas at a temperature of 1000° C., over a long period of time. Such a ribbon containing a large amount of Al cannot be produced by the rolling method but can be obtained by the method according to the present invention. However, when the Al content exceeds 20%, the melting point is lowered to the proximity of the service temperature, and in addition, intermetallic compounds are formed, thereby embrittling the material. The Al content is, therefore, desirably 20% or less. A preferred Al content is from 7 to 20%.

Desirably, some Cr is contained to ease the selective oxidation of Al and to maintain the corrosion resistance at a room temperature. An excess of Cr, however, embrittles the ribbon in the same way as Al. The Cr or less also is usually contained, in the light of the balance of the steelmaking, for producing the raw material by a rapid solidification method.

Note, to enhance the oxidation resistance and adhesion of $Al_2O_3$, one or more of (A) through (D) is included: wherein (A) is Si in an amount of 3% or less; (B) is one or more of Ti, Nb, Zr, and Hf in an amount of 1% or less, each; (C) is one or more of Y and a rare earth metal in an amount of 0.1% or less; and, (D) is one or more of Ca and Mg in an amount of 0.01% or less.

In addition, to enhance the high temperature-strength, one or more of (E) through (G) is included: wherein (E) is C in an amount of 1% or less; (F) is Ni in an amount of 65%; and, (G) is one or more of Mo, W, and Co in an amount of 10% or less, each. The components other than those mentioned above are Fe and impurities in balance.

In the present invention, since a stainless steel ribbon is obtained by a direct solidification from the molten state, the addition amount of alloying elements is not limited from the viewpoints of hot workability, cold workability, and machinability, as described above. Therefore, a catalyst carrier could be produced in which the content of Al, Si, Ti, Nb, Zr, Hf, Y, REM (rare earth metal), Ca, Mg, or the like is so high that the oxidation resistance and adhesion of $Al_2O_3$ are improved but the rollability seriously degraded.

Next, the term "rapid solidification directly from the molten state" as used herein signifies to rapidly cool the molten, Al-containing stainless steel at a cooling speed of at least approximately $10^3$ °C./sec and to obtain a ribbon directly from the molten state. There are a number of known means for rapidly solidifying high-Al stainless steel at a high cooling speed into the form of a ribbon. That is, it is possible to optionally select any appropriate means capable of forming a thin product in the state of a ribbon from such means for producing a continuous cast ribbon as a single roll method, in which the molten steel formed by an ordinary melting means, such as a high frequency, a medium frequency, or low frequency-induction furnace, or an arc melting furnace, is melted and is caused to flow on one roll or a roll with an auxiliary roll, a twin roll method, in which the melt is caused to flow between the rolls, or a Hazelett method in which the melt is caused to flow between belts. The cooling speed herein can be controlled by adjusting the temperature of a cooling roll or a belt, or by adjusting the contact length between the roll or belt and a ribbon.

DESCRIPTION OF THE PREFERRED EMBODIMENTS

Figure 1:
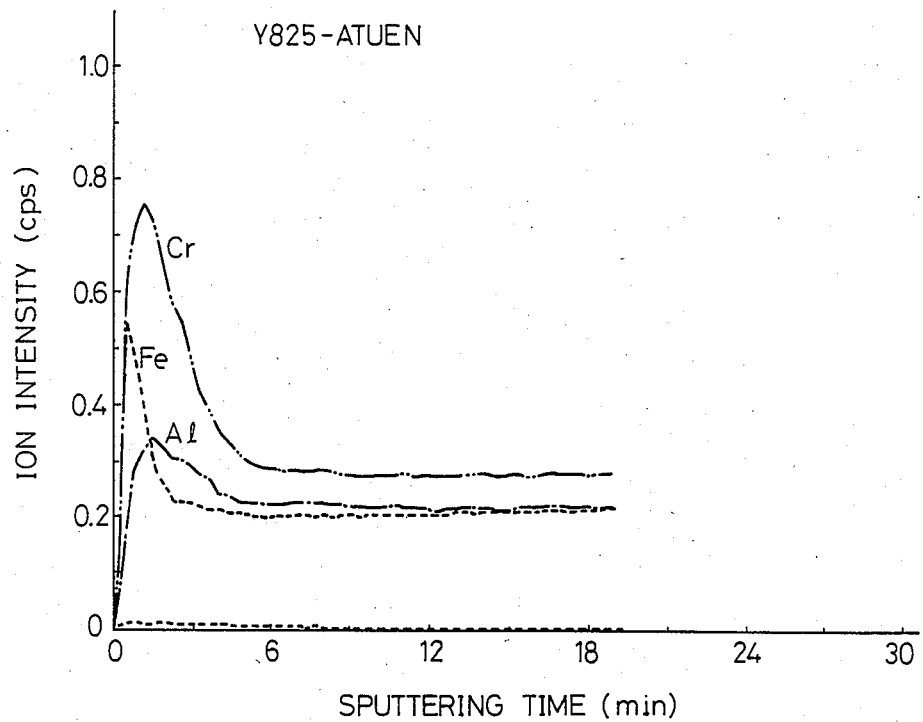
FIG. 1 shows an IPMA image (Ion Sputtering Micro Analysis Image) showing the distribution of Al, Fe, and Cr in a direction along a depth from the surface of a ribbon made by the method of rolling a 15 Cr-4.6 Al material.
Figure 2:
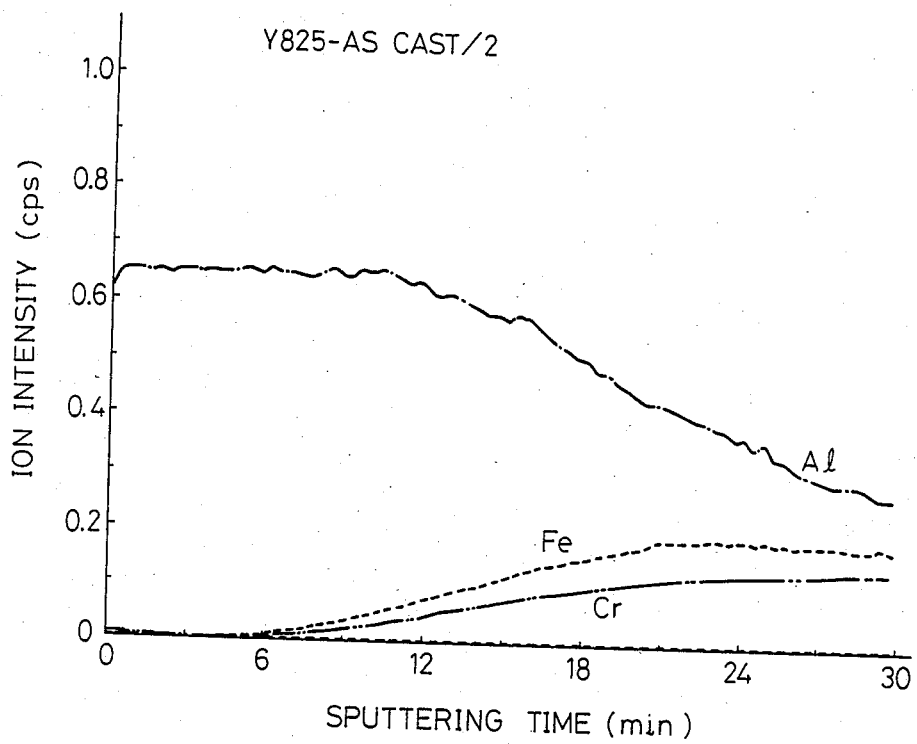
FIG. 2 shows an IPMA image showing the distribution of elements in the same dimension of a rapidly solidified ribbon of 15 Cr-4.6 Al material, measured under the same conditions as in FIG. 1.

One of the most significant features according to the present invention resides in that, as opposed to an extremely thin passivation film mainly composed of Cr, which is present on the surface of a ribbon produced by the rolling method, as shown in FIG. 1, an Al concentrated layer is present on the surface of a rapidly solidified Al-containing stainless steel, as shown in FIG. 2, with the result that the $Al_2O_3$ film is extremely easily and uniformly formed during service in a high temperature-exhaust gas, and contributes to the maintaining of an improved adhesion with respect to $\gamma$-$Al_2O_3$ powder, as described above.

The speed for rapidly cooling and solidifying is desirably at least $10^3$ °C./sec as described above, because, in the ribbon rapidly cooled at a speed of $10^3$ °C./sec or more, the iron-containing oxide is not formed but the Al-concentrated layer is formed on the surface thereof. In addition, the columnar crystals oriented toward the ribbon surface are formed during the solidification, and the columnar crystals formed are extremely fine, i.e., the diameter of grains measured in a longitudinal direction of a ribbon is 30 $\mu$m or less. The Al in the material interior thus easily diffuses to the surface of a ribbon through the grain boundaries oriented principally along the thickness. The $\alpha$-$Al_2O_3$ in the form of flakes and whiskers, which contributes to a rigid bonding of porous $\gamma$-$Al_2O_3$ powder, i.e., the direct carrier of a platinum catalyst, will form upon heating in an oxidizing atmosphere, as the Al-containing stainless steel ribbon formed by the peeling method as described above forms $\alpha$-$Al_2O_3$ flake or whisker when heated. If the cooling speed of the rapid cooling and solidification is less than $10^3$ °C./sec, the grain diameter of columnar crystals formed during the solidification becomes so large that, upon heating in a high-temperature, oxidizing atmosphere, it is difficult to uniformly form the $Al_2O_3$ in the form of a flake or whisker over the surface of a ribbon. A desirable lower limit of the cooling speed is, therefore, $10^3$ °C./sec. The upper limit of cooling speed is not particularly denoted, since this speed is spontaneously determined by the thermal conductivity of material. For example, the upper limit of the cooling speed is $10^6$ °C./sec for a ribbon thickness of 50 $\mu$m. Accordingly, a catalyst carrier for exhaust gas of an automobile according to a preferable embodiment of the present invention has an Al-concentrated layer on a surface thereof, and a thickness of from 30 to 70 $\mu$m, and is rapidly solidified at a speed such that a metallurgical structure of ribbon is a columnar structure with grain boundaries principally oriented in a direction along the thickness of the ribbon and the grain diameter measured in a longitudinal direction across the ribbon being 30 $\mu$m at the greatest.

Figure 3:
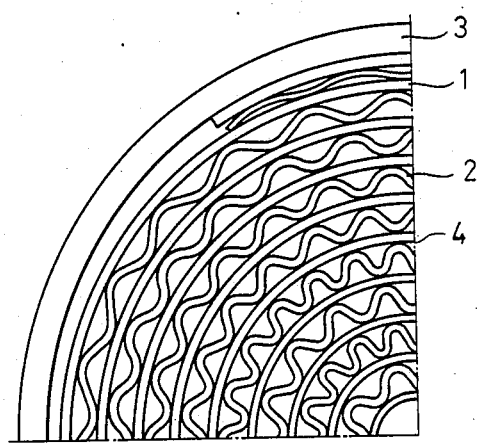
FIG. 3 shows a cross section of a known catalyst carrier by a quater.

The catalyst carrier according to the present invention can be obtained by forming a stainless steel ribbon obtained by the above method into a corrugated form, which is coiled with a ribbon in the original flat form into a roll or is laminated with the flat ribbon one by another to form a laminate, or further coiling a laminate in the form of a roll, thereby obtaining a honeycomb structure. In FIG. 3, a catalyst carrier shown in U.S. Pat. No. 4,186,172 is illustrated. A flat ribbon 1 and a corrugated ribbon 2 according to the present invention are coupled and coiled and inserted in an outer tube 3. The contact points 4 between the ribbons 1 and 2 are partly or continuously brazed.

When an Al-containing stainless steel is solidified in the atmosphere by the above described methods, a thin layer of Al-oxide is formed on the surface of a ribbon already in the solidification and cooling steps and, therefore, the ribbon exhibits a satisfactory adhesion to the $\gamma$-$Al_2O_3$, in the solidified state. It is consequently possible to form the ribbon in the honeycomb form, which is not heat-treated to precipitate the $Al_2O_3$ whisker, to be coated with the $\gamma$-$Al_2O_3$ powder with an impregnated noble metal-catalyst, and is strengthened by precipitating the $Al_2O_3$ flake or whisker during service at a high temperature.

According to a method for producing a catalyst carrier for the exhaust gas purification device of an automobile, a ribbon of Al-containing stainless steel is rapidly cooled and solidified and then coiled at a temperature of at least 500° C., preferably 600° C. By this coiling, a heat recuperation occurs whereby the temperature of a rapidly cooled ribbon once reverts to a temperature higher than the coiling temperature and is then slowly cooled, thereby bringing about an annealing effect and hence improving the formability of a ribbon when forming it into a honeycomb in a subsequent step. The lower limit of the coiling temperature is 500° C., because the annealing effect is not obtained at a coiling below this temperature.

The preferred embodiments of present invention are described hereinafter by way of examples.

EXAMPLE 1

The Al-containing stainless steels having the various chemical compositions shown in Table 1 were vacuum-melted, and ingots 10~100 kg in weight were prepared. Several of the ingots were cut into halves. Each one of the halves was hot-rolled to a thickness of 3.5 mm after machining the surface thereof. The ingots, which were successfully hot-rolled, were repeatedly subjected to annealing, pickling, and cold-rolling, thereby obtaining a thickness of 40 $\mu$m. These rolled products are denoted as R. The remaining halves of the ingots were cut into pieces and remelted in an induction furnace. Each metal melt was injected on a roll in air and rapidly solidified into a ribbon thereon. In this production of a ribbon, the melting temperature was 1450° C., the injection pressure of the molten steel was 0.25~0.21 kg/cm², and, the circumferential speed of a Cu alloy-roll 600 mm in diameter was 15 m/sec. The ribbons were from 37 to 52 $\mu$m thick. Several other samples were solidified at various cooling speeds, by varying the surface temperature of the roll or its material. Several still other samples were coiled, after solidification, at a temperature of 630° to 790° C., and slowly cooled by covering the coils with a heat-insulation cover. These samples are denoted as S.

With regard to the rapidly solidified ribbons denoted as Q, the longitudinal cross sectional structure of the ribbons was observed by a Computer Aided Analyzer to determine the distribution of Cr. In addition, the solidification speed was assumed from the arm spacing of columns. Furthermore, an Auger electron spectroscopy of the surface of all of the ribbons, including those produced by a rolling method, was carried out to measure the Al-concentration on the surface and to detect the presence or absence of the Al-concentrated layer. All of the ribbons were then subjected to a tensile test in a longitudinal direction, to measure the elongation thereof. The results are shown in Table 1.

As shown in these results, even the materials 8R and 2R, which could not provide rolled coils due to cracking during the hot or cold rolling, could, according to the present invention, provide ribbons capable of producing the catalyst carrier. In addition, the Al-concentrated layer was already formed on the surface of rapidly solidified ribbons, but an appreciable Al-concentrated layer was not observed on the rolled ribbons.

With the use of all of the ribbons, honeycombs were produced by roll-forming ribbons in the corrugated form, laminating those ribbons with ribbons in the original flat form, and winding the laminates in the form of a rolled metallic honeycomb 40 mm in outer diameter and 30 mm in length. The ribbons were joined by local brazing. Since the rapidly solidified ribbons comprised the solidified structure, the workability thereof was evidently poor. Several ribbons, had to be heated to prevent cracks during the corrugation process. The ribbons which were subsequently coiled at a high temperature, could be worked into a corrugated form without heating. This corresponds, as apparent from the elongation values given in Table 1, to an elongation restoration of approximately 0.5% in the samples (2Q4S~7Q4S) coiled at a high temperature, compared with the samples (2Q4~7Q4) havng the same charges but not coiled at a high temperature.

Each of the honeycombs in the roll form mentioned above were fixed by brazing on the front end of an inner side of a front tube which was to be connected to the exhaust manifold of a gasoline engine having a displacement of 1600 cc. The $\gamma$-$Al_2O_3$ powder, which was preliminarily impregnated with platinum chloride, dried, and baked, was suspended in the slurry form, deposited on the metal honeycombs, and dried. The front tube was then connected to the exhaust manifold. Ten cycles of operation of 4000 rpm×30 HP for 30 minutes and stop for 30 minutes, were then carried out. After disconnection of the front tube, the deposition of $\gamma$-$Al_2O_3$ powder on the honeycomb was investigated. The ignition position was adjusted so that the temperature of the exhaust gas in the proximity of the honeycombs was from 880° to 920° C. during the engine operation. As a result of the investigation, it was found that, in the deposition of $\gamma$-$Al_2O_3$ on the honeycomb, $\gamma$-$Al_2O_3$ locally peeled from the carrier (1R) produced by a rolling method and the ribbons (1Q1, 1Q2) produced by the rapid solidification method at a relatively slow cooling speed, but no peeling of $\gamma$-$Al_2O_3$ occurred for the ribbons which were produced by the method of rapidly solidifying at a speed of 1000° C./sec or more. After the test, a part of the honeycombs was cut, and the surface, from which the $\gamma$-$Al_2O_3$ powder was removed, then observed by a scanning type electron microscope. It was found that $Al_2O_3$ in the form of flake or whiskers was appreciably formed on the ribbons rapidly solidified at a speed of 1000° C./sec or more, while in the other ribbons, $Al_2O_3$ in the form of flake or whisker was not observed or were found to have formed separately.

TABLE 1

| | Chemical composition (weight %) | | | | | | | | | | | | | | | | |
|---|---|---|---|---|---|---|---|---|---|---|---|---|---|---|---|---|---|
| | C | Si | Mn | Ni | Cr | Al | Mo | W | Co | Ti | Nb | Zr | Hf | Y | REM | Ca | Mg |
| Comparative 1R | 0.048 | 0.55 | 0.51 | 25.7 | 16.9 | 5.1 | — | — | — | — | — | — | — | — | — | 0.003 | — |
| Comparative 1Q1 | 0.048 | 0.55 | 0.51 | 25.7 | 16.9 | 5.1 | — | — | — | — | — | — | — | — | — | — | — |
| Comparative 1Q2 | 0.048 | 0.55 | 0.51 | 25.7 | 16.9 | 5.1 | — | — | — | — | — | — | — | — | — | — | — |
| Invention 1Q3 | 0.048 | 0.55 | 0.51 | 25.7 | 16.9 | 5.1 | — | — | — | — | — | — | — | — | — | — | — |
| Invention 1Q4 | 0.048 | 0.55 | 0.51 | 25.7 | 16.9 | 5.1 | — | — | — | — | — | — | — | — | — | — | — |
| Comparative 2R | 0.008 | 0.11 | 0.13 | — | 15.2 | 7.9 | — | — | — | — | — | 0.33 | — | — | 0.04 | — | — |
| Invention 2Q4 | 0.008 | 0.11 | 0.13 | — | 15.2 | 7.9 | — | — | — | — | — | 0.33 | — | — | 0.04 | — | — |
| Invention 3Q4 | 0.013 | 0.52 | 0.32 | — | 15.4 | 4.6 | — | — | — | 0.30 | — | — | — | — | — | — | — |
| Invention 4Q4 | 0.004 | 0.08 | 0.10 | — | 20.8 | 5.2 | — | — | — | — | 0.51 | — | 0.11 | 0.05 | — | — | — |
| Invention 5Q4 | 0.005 | 0.09 | 0.09 | — | 24.9 | 4.2 | — | — | — | — | — | 0.31 | — | — | — | — | 0.002 |
| Invention 6Q4 | 0.005 | 0.08 | 0.11 | — | 28.7 | 2.2 | — | — | — | 0.21 | — | 0.20 | — | — | 0.03 | — | — |
| Invention 7Q4 | 0.008 | 0.10 | 0.12 | — | 12.2 | 8.6 | — | — | — | 0.23 | — | — | 0.09 | 0.04 | — | — | — |
| Comparative 8R | 0.52 | 1.09 | 1.52 | 26.8 | 17.2 | 5.3 | — | — | — | — | — | 0.30 | — | — | — | 0.0020 | — |
| Invention 8Q4 | 0.52 | 1.09 | 1.52 | 26.8 | 17.2 | 5.3 | — | — | — | — | — | 0.30 | — | — | — | 0.0020 | — |
| Invention 9Q4 | 0.020 | 0.32 | 0.82 | 24.9 | 15.1 | 4.7 | 2.3 | — | — | 0.21 | — | — | 0.12 | 0.03 | — | — | — |
| Invention 10Q4 | 0.054 | 0.31 | 0.99 | 21.8 | 16.8 | 4.9 | — | — | 10.3 | — | — | 0.42 | — | — | 0.03 | — | — |
| Invention 11Q4 | 0.042 | 0.52 | 0.87 | 6.2 | 18.2 | 5.1 | 2.0 | 1.1 | — | — | 0.32 | 0.10 | — | — | — | — | 0.002 |
| Invention 12Q4 | 0.035 | 0.42 | 1.05 | 42.7 | 20.0 | 7.1 | 3.2 | 1.0 | — | 0.82 | — | — | — | — | 0.04 | — | — |
| Invention 13Q4 | 0.047 | 0.53 | 0.88 | 60.4 | 18.2 | 6.3 | — | — | — | 0.79 | 0.05 | — | — | — | 0.02 | — | Al |
| Invention 14Q4 | 0.41 | 1.22 | 0.61 | 24.8 | 17.1 | 5.2 | — | 3.1 | — | 0.32 | 0.10 | — | — | — | — | — | 0.001 |
| Invention 15Q4 | 0.15 | 0.53 | 0.97 | 50.7 | 16.9 | 5.0 | 3.1 | — | 5.2 | — | — | 0.32 | — | 0.02 | — | 0.001 | — |
| Invention 2Q4S | | | | | | | | | same as 2Q4 | | | | | | | | |
| Invention 3Q4S | | | | | | | | | same as 3Q4 | | | | | | | | |
| Invention 4Q4S | | | | | | | | | same as 4Q4 | | | | | | | | |
| Invention 5Q4S | | | | | | | | | same as 5Q4 | | | | | | | | |
| Invention 6Q4S | | | | | | | | | same as 6Q4 | | | | | | | | |
| Invention 7Q4S | | | | | | | | | same as 7Q4 | | | | | | | | |
| Invention 16Q4S | 0.01 | 0.22 | 0.31 | — | 11.9 | 9.4 | — | — | — | — | — | — | — | — | — | 0.003 | — |
| Invention 17Q4S | 0.008 | 0.25 | 0.30 | — | 10.2 | 10.5 | — | — | — | — | — | — | 0.02 | — | — | — | — |
| Invention 18Q4S | 0.012 | 0.19 | 0.33 | — | 8.9 | 11.2 | — | — | — | 0.1 | — | — | — | — | 0.03 | — | — |
| Invention 19Q4S | 0.006 | 0.17 | 0.32 | — | 7.1 | 12.0 | — | — | — | — | — | — | 0.03 | — | — | — | — |
| Invention 20Q4S | 0.006 | 0.20 | 0.29 | — | 6.0 | 13.4 | — | — | — | — | — | — | — | — | 0.02 | — | — |
| Invention 21Q4S | 0.008 | 0.21 | 0.27 | — | 5.2 | 15.3 | — | — | — | — | — | — | 0.12 | — | — | — | 0.002 |
| Invention 22Q4S | 0.009 | 0.18 | 0.32 | — | 3.5 | 16.4 | — | — | — | — | — | 0.30 | — | — | — | — | — |
| Invention 23Q4S | 0.007 | 0.18 | 0.30 | — | 2.3 | 17.2 | — | — | — | 0.33 | — | — | — | — | — | — | — |
| Invention 24Q4S | 0.008 | 0.22 | 0.31 | — | — | 19.6 | — | — | — | — | — | 0.20 | — | — | — | 0.002 | — |

Elongation   Al-concentrated   Peeling of $\gamma$-$Al_2O_3$ in   Grain size

TABLE 1-continued

|  | Producability of Ribbon | (%) | layer present | Test by Actual Machine | (μm) |
|---|---|---|---|---|---|
| Comparative 1R | rollable | 3.6 | absent | present | 53 |
| Comparative 1Q1 | possible to rapidly solidify | 2.5 | present | partly present | 37 |
| Comparative 1Q2 | " | 2.4 | " | " | 34 |
| Invention 1Q3 | " | 2.7 | " | absent | 28 |
| Invention 1Q4 | " | 2.8 | " | " | 21 |
| Comparative 2R | crack in the cold-rolling | — | — | — | — |
| Invention 2Q4 | possible to rapidly solidify | 0.1 | present | absent | 28 |
| Invention 3Q4 | " | 0.2 | " | " | 25 |
| Invention 4Q4 | " | 0.1 | " | " | 27 |
| Invention 5Q4 | " | 0.1 | " | " | 23 |
| Invention 6Q4 | " | 0.2 | " | " | 20 |
| Invention 7Q4 | " | 0.2 | " | " | 26 |
| Comparative 8R | cracks during hot rolling | — | — | — | — |
| Invention 8Q4 | possible to rapidly solidify | 2.2 | present | absent | 18 |
| Invention 9Q4 | " | 3.2 | " | " | 29 |
| Invention 10Q4 | " | 2.7 | " | " | 26 |
| Invention 11Q4 | " | 0.6 | " | " | 25 |
| Invention 12Q4 | " | 1.9 | " | " | 28 |
| Invention 13Q4 | " | 4.0 | " | " | 23 |
| Invention 14Q4 | " | 2.4 | " | " | 27 |
| Invention 15Q4 | " | 2.5 | " | " | 27 |
| Invention 2Q4S | " | 0.5 | " | " | 28 |
| Invention 3Q4S | " | 0.6 | " | " | 25 |
| Invention 4Q4S | " | 0.5 | " | " | 27 |
| Invention 5Q4S | " | 0.5 | " | " | 23 |
| Invention 6Q4S | " | 0.7 | " | " | 20 |
| Invention 7Q4S | " | 0.7 | " | " | 26 |
| Invention 16Q4S | Possible to rapidly solidify | 0.5 | present | absent | 23 |
| Invention 17Q4S | " | 0.5 | " | " | 29 |
| Invention 18Q4S | " | 0.5 | " | " | 27 |
| Invention 19Q4S | " | 0.5 | " | " | 25 |
| Invention 20Q4S | " | 0.4 | " | " | 28 |
| Invention 21Q4S | " | 0.4 | " | " | 27 |
| Invention 22Q4S | " | 0.4 | " | " | 25 |
| Invention 23Q4S | " | 0.4 | " | " | 29 |
| Invention 24Q4S | " | 0.4 | " | " | 30 |

We claim:

1. A ribbon for use as a metal honeycomb of a catalyst carrier of a catalyst converter, consisting of an Al-containing stainless steel ribbon having an Al content of 20% or less and an Si coontent of 3% or less, which is produced directly by a process of solidifying the Al-containing stainless steel from a molten state thereof directly into a form of a ribbon at a cooling speed of at least $10^3$ °C./sec, thereby forming an Al-concentrated layer on a surface of said ribbon as solidified, said ribbon having as a metallurgical structure a columnar structure with grain boundaries principally oriented in a direction along a thickness of the ribbon and a maximum grain diameter measured perpendicularly to the columnar axis of 30 μm.

2. A ribbon according to claim 1, wherein the Al content is from 5 to 20% by weight.

3. A ribbon according to claim 1, wherein said ribbon has a thickness of from 30 to 70 μm.

4. A carrier for a catalyst for purification of exhaust gas of an automobile, which is produced by a process of solidifying a ribbon of an Al-containing stainless steel having an Al content of 20% or less and an Si content of 3% or less from a molten state thereof directly into a form of a ribbon at a cooling speed of at least $10^3$°C./sec, thereby forming an Al-concentrated layer on a surface of said ribbon as solidified, said carrier having as a metallurgical structure a columnar structure with grain boundaries principally oriented in a direction along a thickness of the carrier and a maximum grain diameter measured perpendicularly to the columnar axis of 30 μm, coiling the ribbon at a temperature of at least 500° C. after solidification, and subsequently forming the coiled ribbon into a honeycomb.

5. A catalyst carrier according to claim 4, wherein said ribbon has a thickness of from 30 to 70 μm.

6. A catalyst carrier according to claim 4, wherein said ribbon has an $\alpha$-$Al_2O_3$ layer thereon having a thickness sufficient for carrying thereon $\gamma$-$Al_2O_3$ which is impregnated with noble metal.

7. A catalyst carrier according to claim 6, wherein said $\alpha$-$Al_1O_3$ layer is formed by heating the ribbon in an oxidizing atmosphere.

8. A catalyst carrier according to claim 7, wherein said heating is carried out in an exhaust gas of an automobile.

9. A catalyst carrier according to claim 7, wherein said $\alpha$-$Al_2O$ layer if formed in a flake- or whisker-form by an oxidation of Al of the stainless steel.

10. A catalyst carrier according to claim 8, wherein the thickness of said $\alpha$-$Al_2O_3$ layer is from approximately 7 μm or more.

* * * * *